United States Patent [19]

Dupre

[11] Patent Number: 4,606,402
[45] Date of Patent: Aug. 19, 1986

[54] SOLAR ICE MELTER FOR ROOF EAVES

[76] Inventor: Herman K. Dupre, Seven Springs, Champion, Pa. 15622

[21] Appl. No.: 195,781

[22] Filed: Oct. 10, 1980

[51] Int. Cl.$^4$ .................... F24H 3/00; F24J 3/02
[52] U.S. Cl. ..................... 165/47; 126/424; 126/434; 126/443; 126/417; 52/173 R
[58] Field of Search ............... 165/47; 52/11, 24, 94, 52/173 R; 126/417, 424, 433, 434, 442, 443, 450

[56] References Cited

U.S. PATENT DOCUMENTS

| | | | |
|---|---|---|---|
| 3,207,211 | 9/1965 | Winterfeldt | 126/417 X |
| 3,366,168 | 1/1968 | Dale | 165/47 |
| 3,388,738 | 6/1968 | Dery | 165/47 |
| 3,716,076 | 2/1973 | Franzmeier | 165/47 X |
| 4,224,923 | 9/1980 | Wells | 126/417 |
| 4,252,183 | 2/1981 | Ricciardelli | 165/47 |
| 4,261,417 | 4/1981 | Tingley | 165/47 |
| 4,291,673 | 9/1981 | Deutz | 126/417 |

FOREIGN PATENT DOCUMENTS

| | | | |
|---|---|---|---|
| 2280036 | 2/1976 | France | 126/443 |

*Primary Examiner*—Margaret A. Focarino
*Attorney, Agent, or Firm*—Carothers & Carothers

[57] ABSTRACT

An apparatus for using solar energy to melt ice at low ambient temperatures on building roof eaves to provide a water run-off for melted ice which might otherwise freeze and backup under the roofing shingles thereby causing leaks in the building roof. An endless tube which is formed to have top and bottom tube loop ends connecting two intermediate elongated tube sections is filled with a fluid heat transfer medium and a solar collector is secured to the bottom tube loop end for solar heat transfer to the fluid. One of the elongated tube sections is covered with insulation. This device is secured to the upper side of a roof eave with the solar collector depending over the bottom edge of the roof eave for exposure to solar radiation. The heated fluid circulates up through the insulated portion of the endless tube and back along the uninsulated portion of the tube melting ice on the roof and providing a water run-off for the melting ice.

6 Claims, 3 Drawing Figures

SOLAR ICE MELTER FOR ROOF EAVES

BACKGROUND OF THE INVENTION

The present invention relates generally to solar energy devices and more particularly to a solar energy device for melting accumulated ice on building roof eaves and providing a water run-off for the melted ice.

In most building structures having a pitched roof, the roof is generally provided with a roof eave overhang to provide for water run-off so that it will not engage or run down the sides of the building structure. In such building structures which are heated during the cold winter months in cold climates, the upper roof surface of the building structure which overlies the building per se is generally warmer than that part of the roof overhang at the eaves, since the eaves are exposed on all sides to the ambient atmosphere. This is particularly true with building structures wherein the building insulation is provided on the roof as opposed to having a fully ventilated attic.

Serious problems occur in the winter time with such building structures wherein after a snow fall, the heat from within the building structure melts the snow on the building roof and the water from the melted snow runs off of the pitched roof. As it runs over the colder roof eaves, a certain amount of the water run-off again freezes, and an ice buildup occurs on the roof eaves. The ice buildup accumulates over a period of time and eventually backs up under the roof shingles of the building structure and there melts and causes serious leaks within the building structure.

As the ice buildup over the eaves increases, it acts as a water dam and water accumulates on the roof behind it and there is no way for this trapped water to run off. It then freezes and as previously stated, it backs up under the roof shingles. In order to prevent this problem, it has been common practice to get up on the roof in such situations and chop water run-off channels in the ice buildup over the roof eaves with a hand axe in order to permit this trapped water to continually run off. This procedure, of course, must be repeated, as ice buildup eventually plugs the hand cut channels. It is a principal object of the present invention to eliminate this problem and the need of having to chop water drain channels through the ice buildup.

SUMMARY OF THE INVENTION

The solar ice melter for roof eaves of the present invention comprises an endless or closed loop elongated tube of heat conductive material which is so fashioned to provide top and bottom tube loop ends connecting two intermediate elongated tube sections. A fluid heat transfer medium, such as antifreeze, fills the endless tube, and solar collector means is secured to the bottom tube loop end for solar heat transfer to the fluid within the endless tube, and insulation covers one of the aforesaid elongated tube sections in order to induce circulation of the solar heated fluid within the endless tube. Means are provided to secure the endless tube to the upper side of a roof eave with the solar collector means depending over the bottom edge of the roof eave for exposure to solar radiation.

The solar collector may consist merely of the bottom tube loop end itself, which preferably would be provided with a black or dark heat-absorbing surface. The solar collector may be further refined by including a heat-conductive plate which is also provided with a dark surface and which is secured for heat transfer to the aforesaid bottom tube loop end of the endless tube. The bottom tube loop end and this plate may be further enveloped and sealed within a transparent cover to permit access of solar radiation but to otherwise insulate the solar collector from the ambient temperatures. Additional insulation may also be provided by heat insulation means which isolates the plate from contact with the transparent cover.

The solar collector is also preferably rotatable so that it may be positioned to provide the most advantageous exposure thereof to solar radiation.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENT

Figure 1:
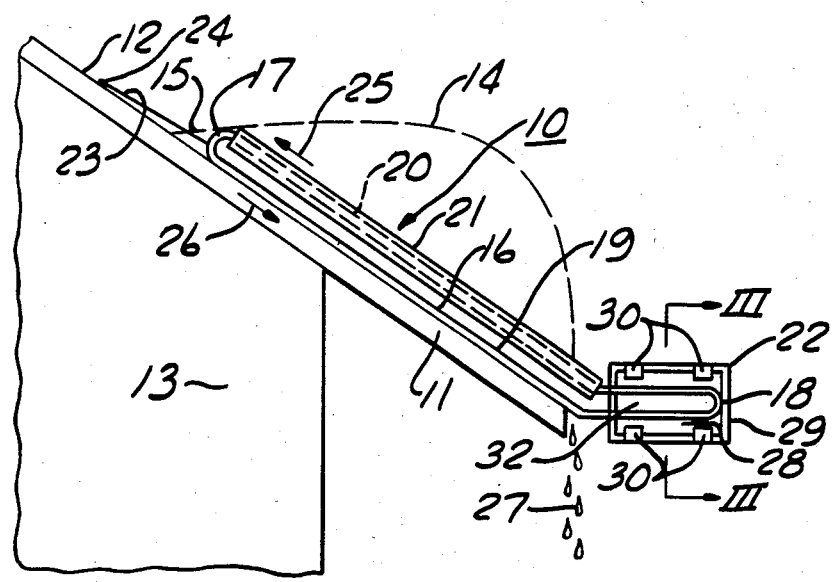
FIG. 1 is a view in front elevation of the solar ice melter for roof eaves of the present invention secured to the upper side of the building roof eave.
Figure 2:
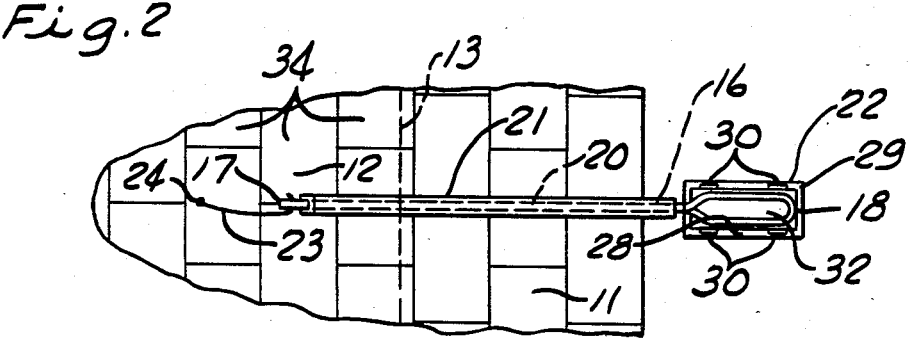
FIG. 2 is a plan view of the solar ice melter for roof eaves illustrated in FIG. 1.

Referring to the Figures, the solar ice melter 10 of the present invention is illustrated as being secured to the upper side of roof eave 11 of roof 12 on building structure 13.

As previously explained, when snow falls on roof 12, it generally in time melts due to heat within building structure 13 or from the sun, and as it melts and runs off the pitched roof 12, much of it will refreeze when running off roof eave overhang 11 which is entirely exposed to the ambient cold temperatures and thereby causes an ice buildup as indicated by the dashed outline 14. This ice buildup remains over the roof eaves during cold temperatures and acts as a dam for water buildup as indicated by the dashed outline at 15 when subsequent melted snow or rain water runs off roof 12. This water buildup 15 then, during the colder times of the day, will also freeze and back up under roof shingles 34 where it will remelt due to building heat and leak into the building structure 13. Accordingly, the object is to drain off this trapped or accumulated water 15 which builds up during the warmer or sunny hours of the day so that it cannot refreeze during the colder times of day. To accomplish this, the solar ice melter 10 of the present invention is utilized.

Figure 3:
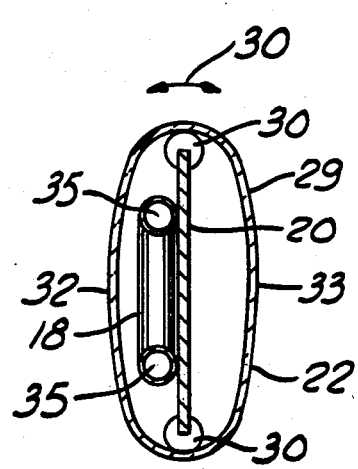
FIG. 3 is an enlarged view in vertical cross section of the solar collector utilized in the solar ice melter for roof eaves illustrated in FIG. 1 and as seen along section line III—III of FIG. 1.

The solar ice melter 10 generally comprises an endless or closed loop elongated tube 16 which is made of a heat conductive material such as copper or aluminum. Endless tube 16 provides a top tube loop end 17 and a bottom tube loop end 18 which connect the two intermediate elongated tube sections 19 and 20. Elongated tube section 20 is insulated for its entire length as indicated by heat sleeve insulation 21. Endless tube 16 is filled with a fluid heat transfer medium, such as antifreeze, alcohol, or water and antifreeze, by any conventional means. Endless tube 16 may be provided with a filler opening to replace or add heat transfer fluid if so desired, or it may be originally filled and purged of air and permanently sealed. The heat transfer medium is illustrated in FIG. 3 by reference numeral 35.

Solar collector 22 is secured to bottom tube loop end 18 for solar heat transfer to the fluid 35. Ice melter 10 is further secured to the roof top 12 by means of wire hook 23 which is secured at 24 to the roof, and the solar ice melter 10 is secured such that solar collector 22 depends out over the bottom edge of the roof eave for exposure to solar radiation. As the fluid in heat transfer medium 35 contained within bottom tube loop end 18 is heated by solar collector 22, it will travel up elongated tube section 20 as indicated by arrow 25 and then circulate back down through elongated tube section 19 as indicated by arrow 26. The reason that the heated fluid will, in fact, circulate in this manner described is that the upper elongated tube section 20 is fully insulated. This circulation principle is, for example, illustrated in U.S. Pat. No. 2,388,940 for Solar Heaters which issued to R. H. Taylor on Nov. 13, 1945.

As the heated fluid medium progresses or circulates down elongated tube section 19 as indicated by arrow 26, it melts the ice 14 surrounding it, thereby creating a water drain path such that water 15 which is trapped by the ice buildup 14 will travel down along the exterior of tube section 19 and drip off of roof eave 11 as indicated at 27 in order to continually permit evacuation of the entrapped water 15.

The solar collector 22 basically consists of tube loop end 18 which is provided with a dark surface to encourage heat absorption. A heat conductive plate 28, which also has a black or dark surface, is secured to tube loop end 18 as by welding or the like for heat transfer from plate 28 to fluid heat transfer medium 35 via tube loop end 18. Bottom tube loop end 18 and conductive plate 28 are further enveloped and sealed within a transparent plastic cover 29. This permits the solar radiation to heat up plate 28 and tube end 18 and yet provides insulation from the cold ambient atmosphere. For additional insulation, heat insulators 30 isolate plate 28 from engagement or contact with transparent cover 29.

When the solar ice melter 10 of the present invention is mounted on the roof top 12 as indicated, it is desirable to be able to rotate solar collector 22 so that it most advantageously faces or is exposed to the afternoon sun. This is accomplished by merely rotating solar-collector 22 as indicated by arrow 31 in FIG. 3, which can easily be accomplished due to the fact that endless conductive tube 16 is made of a metal which will bend, and thus, one need only to rotate solar collector 22 thereby bending the tubes until the solar collector faces the desired direction.

Another advantage of solar collector 22 is that not only is the primary heat absorption side 32 positioned to be exposed directly to the afternoon sun, but the back side 33 of the collector will absorb additional solar radiation which is reflected from the ground snow cover.

I claim:

1. A solar ice melter for roof eaves comprising, an endless or closed loop elongated tube of heat conductive material providing top and bottom tube loop ends connecting two intermediate elongated tube sections, a fluid heat transfer medium filling said endless tube, solar collector means secured to said bottom tube loop end for solar heat transfer to said fluid, insulation covering one of said elongated tube sections, and means to secure said endless tube to the upper side of a roof eave with said solar collector means depending over the bottom edge of the roof eave for exposure to solar radiation.

2. The solar ice melter for roof eaves of claim 1, wherein said solar collector comprises said bottom tube loop end having a dark surface.

3. The solar ice melter for roof eaves of claim 2, wherein said solar collector further includes a heat conductive plate having a dark surface and secured for heat transfer to said bottom tube loop end.

4. The solar ice melter for roof eaves of claim 3, wherein said bottom tube loop end and said plate are enveloped and sealed within a transparent cover.

5. The solar ice melter for roof eaves of claim 4, including heat insulation means isolating said plate from contact with said cover.

6. The solar ice melter for roof eaves of claim 1, including means to rotate said solar collector to provide the most advantageous exposure thereof to solar radiation.

* * * * *